United States Patent [19]
Brooks

[11] Patent Number: 5,533,795
[45] Date of Patent: Jul. 9, 1996

[54] BRAKE SAFETY SYSTEM FOR VEHICLES WITH SEAT AND DOOR CONTROL

[76] Inventor: Louie J. Brooks, 1142 Littlevine Church Rd., Villa Rica, Ga. 30180

[21] Appl. No.: 536,176

[22] Filed: Sep. 29, 1995

Related U.S. Application Data

[63] Continuation of Ser. No. 287,929, Aug. 9, 1994, abandoned.
[51] Int. Cl.⁶ ........................................ B60T 7/14
[52] U.S. Cl. ........................ 303/6.1; 180/273; 180/280
[58] Field of Search .................. 303/6.1; 180/273, 180/280

[56] References Cited

U.S. PATENT DOCUMENTS

| | | | |
|---|---|---|---|
| 3,601,453 | 8/1971 | Silverman | 303/6.1 |
| 3,790,223 | 2/1974 | Fontaine | 180/273 |
| 3,893,697 | 7/1975 | Blitz et al. | 303/6.1 |
| 3,905,651 | 9/1975 | Hornung | 303/6.1 |
| 4,546,845 | 10/1985 | Meyer et al. | 303/6.1 |

*Primary Examiner*—Matthew C. Graham
*Attorney, Agent, or Firm*—Jones & Askew

[57] ABSTRACT

The parking brake of a vehicle is automatically operated whenever the driver or operator leaves the operator's seat and/or opens the door to the vehicle. A seat switch and a separate door switch are electrically wired to an electrical solenoid which operates a valve that controls the supply of air from an air tank through a manual air valve to the brakes. The seat and door switches are connected in parallel to the ignition switch wired to the battery which is grounded to a common ground with the solenoid, whereby either the seat switch or the door switch be closed to release the brakes.

16 Claims, 1 Drawing Sheet

BRAKE SAFETY SYSTEM FOR VEHICLES WITH SEAT AND DOOR CONTROL

This is a continuation of application Ser. No. 08/287,929, filed Aug. 9, 1994 now abandoned.

BACKGROUND OF THE INVENTION

1. Field of the Invention

Safety devices for vehicles to prevent the movement of the vehicle whenever the operator leaves a seat and opens the driver's door. The system employs an electrical circuit using respective seat and door switches in conjunction with control of the parking brake.

2. Background of the Invention

Safety systems for vehicles are sometimes known generally as "dead man controls" and are quite common not only for vehicles but also for machinery, lawn mowers, and in many other fields of invention. Basically, such devices employ a switch which is actuated whenever the operator performs a certain act, or fails to perform a certain act such as taking his hand off a control, leaving the seated position, or exceeding certain limits of operation. There is considerable prior art having to do with the operation of vehicles such as trains or automobiles. The present device is especially applicable to a dump truck as a precaution whenever the truck is parked so as to require that the parking brake be applied. The prior U.S. patents include the following:

U.S. Pat. No. 3,790,223 closes a vacuum brake control system including a solenoid which is energized to apply the vehicle's brakes when both seat and door switches (in series) sense that the vehicle's operator has opened the door and left his seat;

U.S. Pat. No. 2,734,590 discloses an automatic brake setting and releasing device which senses both the presence of an operator and the condition of the vehicle's door;

U.S. Pat. No. 3,190,223 discloses a brake control system including a solenoid which is energized to apply a vehicle's brakes when seat and door switches sense the vehicles's operator has opened the door and left the seat;

U.S. Pat. No. 3,830,330 discloses an automatic parking or emergency brake system including switches which sense pressure on an operator's seat and other devices such as the throttle;

U.S. Pat. No. 3,721,310 discloses a safety brake system which applies an emergency brake in response to opening of the vehicle door when the ignition switch is off or while the gear selector is in the neutral position;

U.S. Pat. No. 4,655,313 discloses a vehicle seat switch for sensing the presence of a vehicle's operator; and U.S. Pat. No. 4,838,617 discloses a braking system for applying the brakes to a vehicle when switches sense the opening of a door.

None of the above noted patents disclose a particular simple system presented in this description of a preferred embodiment wherein the parking brake is automatically applied whenever the operator leaves the seat and opens the door. Furthermore, the present system does not require the use of electrical relays which necessarily include spring biased switch mechanisms that sometimes are not dependable but the present system uses an arrangement of electrical switches which control the current in the system efficiently, inexpensively and effectively to operate the system through the use of a seat switch and a door switch electrically wired from a battery to the electric solenoid for the automatic operation of the spring brake air valve of the parking brake. This provides a simple and dependable system which is virtually fool proof and is practically impervious to dirt and corrosion and other conditions which develop throughout the use of utility trucks, such as a dump truck.

A principal advantage of the present system is the simplicity and economy of use and installation together with dependability of operation.

SUMMARY OF THE INVENTION

A so-called "DEAD MAN CONTROL" for a dump truck, or other vehicle has a door and a driver's seat in which is located a seat switch operated by the pressure from the weight of the body of the driver and the door switch being operated whenever the door is opened. The seat switch and the door switch are wired from the ignition switch in separate parallel circuits to the grounded battery and with an electrical control, such as an electric solenoid, which operates and controls the distribution of air pressure through and air valve to the parking brake. In operation whenever the driver leaves the seat and opens the door of the truck, the air parking brake is operated.

Therefore, a basic object of this invention is to provide a simple and efficient circuit arrangement which can be applied to a vehicle such as a dump truck to provide a maximum of safety against accidents.

Another object of this invention is found in the use of a respective seat switch and a door switch in parallel circuits whereby actuation of both will result in operation of the parking brake system.

Other further objects and advantages will become apparent upon reading the Description of the Preferred Emodiment in conjunction with the accompanying drawings.

DESCRIPTION OF A PREFERRED EMBODIMENT

Figure 1:
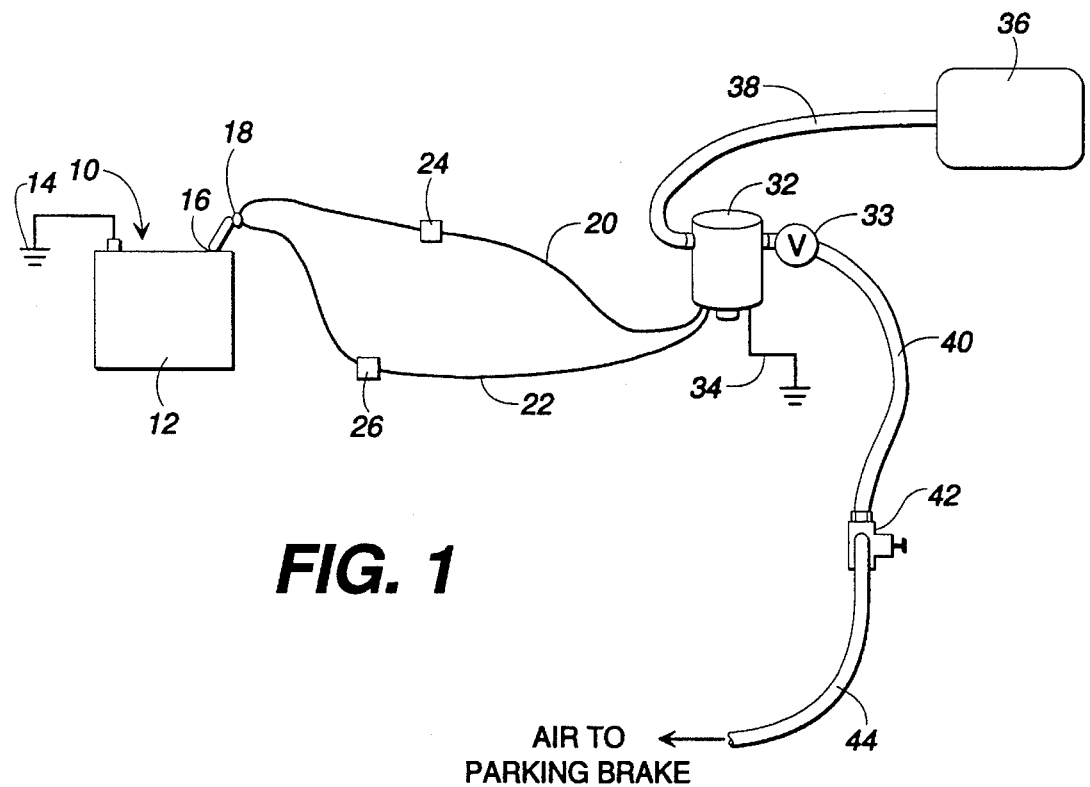
FIG. 1 is a wiring diagram of the present safety system illustrating the use of a seat switch and a separate door switch in conjunction with separate wires in parallel.

Referring initially to the diagram in FIG. 1, it is intended that the system disclosed by the diagram be installed into a vehicle such as a dump truck, automobile, tractor or even some other device which has both a seat for an operator and a door which is usually used by the operator for entering and leaving the vehicle drivers seat. The entire system is designated by reference numeral 10 and comprises an electrical battery 12 having a ground terminal 14 and a plus terminal 16 wired to a conventional ignition switch 18 which normally is operated by a key. A first hot wire 20 and a second hot wire 22 are connected to a respective seat switch 24 and door switch 26 to one side of a conventional electrical solenoid 32 and valve 33 grounded by ground wire 34 and which is connected to an air tank 36 by means of an air hose 38. Seat switch 24 is pressure operated by the weight of a driver and such switches are disclosed in U.S. Pat. Nos. 3,790,223 and 3,830,330. A second air hose 40 extends form the electrical solenoid 32 to a conventional manual spring brake air valve 42 connected by an air hose 44 to the air piston and conventional mechanism of an air system for a parking brake which is not shown.

Figure 2:
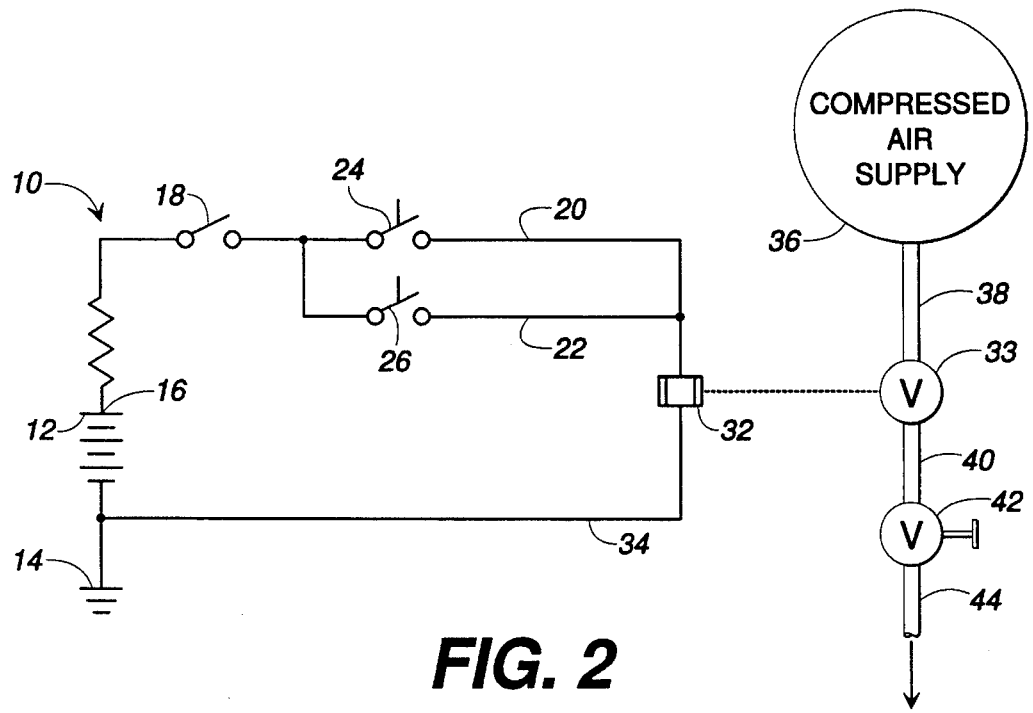
FIG. 2 is an electrical schematic diagram of the electrical system shown in FIG. 1 in which a seat switch and a separate door switch are wired to a hot wire from the ignition switch to the parking brake solenoid control.

The wiring diagram and system disclosed and shown in detail in FIG. 1 is also shown by means of the electrical schematic diagram of FIG. 2 which of course contains all of the components of the system in FIG. 1 and the operation of the system in FIGS. 1 and 2 is the same, to wit:

In the operation of the vehicle (not shown) the ignition switch 18 is actuated to place the vehicle in normal operation, and so long as the operator is properly seated the pressure seat switch 24 is closed and/or if the door is properly closed the door switch 26 is closed and there is a complete circuit through the electrical solenoid 32. Air is admitted through valve 33 which then permits the normal operation of the spring brake air valve 42 so that the parking brake can be placed into released condition by the operator and the vehicle driven in normal fashion whereby the foot pedal or other manual brake control utilizes air from air tank 36 through the air hoses 38, 40 and 44 to release the parking brake and allow the usual braking and release of braking of the vehicle. However, whenever the vehicle operator should leave the seat, as for example, when the vehicle is stopped and the operator opens the driver's door (not shown) the parking brake is automatically applied and can't be released until the operator returns to place the proper amount of pressure on seat switch 24 which is a conventional pressure-type seat switch available from many commercial sources. Likewise, if the operator opens the door while not seated the door switch 26 opens and the parking brake is either automatically applied or remains applied until the door is closed. Therefore, in the operation of the vehicle from a safety standpoint the parking brake is always on whenever the operator is out of the seat 23 and has opened the door. In the electrical operation of the device as disclosed by both FIGS. 1 and 2 the above noted operation is accomplished by means of the respective switches 24 and 26 which are both contained in a separate respective individual circuit including the wiring 20 and 22 to the electrical solenoid 32 in such a way that the current from the hot side of the battery 12 through the ignition switch 18 cannot flow but in one direction and therefore both switch 24 or 26 will actuate the electrical solenoid whenever the switches 24, 26 are closed. This provides a virtually foolproof system which prevents the operator from opening the door and leaving the seat without setting the brake which happens very often in the use of dump trucks or from attempting to operate the vehicle while the door is still open. This arrangement could conceivably result in a reduction in insurance cost because of the enhanced safety value of the system.

While I have shown and described a particular embodiment of this invention and emphasized its use in connection with a vehicle such as a dump truck this is by way of presentation and illustration and does not constitute any restriction on the scope of the invention since there are various alterations, changes, deviations and departures which may be made in the preferred embodiment without avoiding the scope of the invention as defined only by a proper interpretation of the pendant claims.

What is claimed:

1. A safety system for comprising:

a truck which has an operator's seat and an operator's door, a source of electricity having a positive and a negative;

an ignition switch having a positive and a negative connected to the respective positive and negative of the source;

a pressure operated seat switch with a first electrical circuit including said seat switch leading from the one side of the source;

a door switch electronically connected in a second parallel circuit to the said one side of said electrical source;

a source of fluid pressure for operating a parking brake on said truck, a manual parking brake release valve, an electrical control means for operating said parking brake;

release valve means for controlling the fluid pressure in response to operation of said electrical means whereby whenever the seat switch and the door switch are open the parking brake is set and applied to prevent the truck from movement so that whenever the operator of the truck leaves the seat and opens the door, the parking brake prevents the movement of the truck until the system is returned to normal and brake released by either the closing of the door or the proper pressure in the seat from the presence of the operator.

2. The device in claim 1 wherein the system includes an air tank and the electrical control means is a solenoid connected to the release valve.

3. The system in claim 2 wherein the manual valve is a conventional spring brake air valve located in the system between the release valve and the parking brake.

4. The device in claim 1 wherein the source of electricity is a conventional vehicle battery having a plus terminal and a minus terminal and the ignition switch is wired to said plus and minus terminals.

5. The system in claim 4, wherein said air supply is connected by air line to said electrical solenoid and said electrical solenoid is connected by an air line to said release valve, and said release valve is connected by an air line to the manual parking brake release valve which in turn is connected by an air line to the parking brake.

6. A safety system for automatically engaging a parking brake of a dump truck, comprising:

a dump truck having an operator's seat, an operator's door, a battery, an air-operated parking brake, a manual parking brake release mechanism, a source of air pressure for operating said parking brake, and an air hose connecting said source of air-pressure to said air-operated parking brake, said air-operated parking brake disengaged in the presence of said air pressure, a pressure operated seat switch positioned in said seat;

a door switch positioned in said door;

an air valve operated by a solenoid;

said air valve inserted in said air hose for controlling said air-operated parking brake; and said seat switch and said door switch arranged in a parallel circuit with said electronic solenoid and said battery such that opening both said seat switch and said door switch causes said solenoid to close said air valve, thereby engaging said air-operated parking brake.

7. The safety system for a dump truck of claim 6 wherein said parking brake remains engaged until either of said door switch or said seat switch is closed and said manual parking brake release mechanism is released.

8. The safety system for a dump truck of claim 6 wherein said solenoid maintains said air valve in an open position when said circuit is closed.

9. The safety system for a dump truck of claim 6 wherein said door switch is controlled by the opening and closing of said door.

10. A safety system for automatically engaging a parking brake of a dump truck, comprising:

a dump truck having an operator's seat, an operator's door, a battery an air-operated parking brake, a manual parking brake release mechanism, a source of air pressure for operating said parking brake, and an air hose connecting said source of air-pressure to said air-operated parking brake, said air-operated parking brake disengaged in the presence of said air pressure, comprising:

an air valve operated by a solenoid:

said air valve inserted in said air hose for controlling said air-operated parking brake;

a pressure operated seat switch positioned in said seat and connected in a circuit to said battery and said solenoid;

a door switch positioned in said door and connected in a parallel circuit to said battery and said solenoid;

said solenoid maintaining said air valve in an open position while either of said circuits is closed.

11. The safety system for a truck of claim 10 wherein said parking brake remains engaged until either of said door switch or said seat switch is closed and said manual parking brake release mechanism is released.

12. The safety system for a dump truck of claim 10 wherein said solenoid closes said air valve when both of said circuits are open.

13. The safety system for a dump truck of claim 10 wherein said door switch is controlled by the opening and closing of said door.

14. A safety system for a dump truck, comprising:

a dump truck having a seat, a door, an air-operated parking brake, a manual parking brake release mechanism, a source of air pressure for operating said parking brake, an air hose connecting said source of air-pressure to said air-operated parking brake, and a battery;

said seat, said door, said air-operated parking brake, said source of air pressure for operating said parking brake, said air hose, and said battery being conventionally located within said dump truck;

a pressure operated seat switch positioned in said seat;

a door switch positioned in said door;

an air valve operated by a solenoid;

said air valve inserted in said air hose for controlling said air-operated parking brake; and said seat switch and said door switch arranged in a parallel circuit with said electronic solenoid and said battery such that opening both said seat switch and said door switch causes said solenoid to close said air valve, thereby engaging said air-operated parking brake.

15. The safety system of claim 14 wherein said parking brake remains engaged until either of said door switch or said seat switch is closed and said manual parking brake release mechanism is released.

16. The safety system of claim 14 wherein said solenoid maintains said air valve in an open position when said circuit is closed.

* * * * *